(12) United States Patent
Kawakami et al.

(10) Patent No.: US 9,777,810 B2
(45) Date of Patent: Oct. 3, 2017

(54) BELT-DRIVEN CONTINUOUSLY VARIABLE TRANSMISSION

(71) Applicant: TOYOTA JIDOSHA KABUSHIKI KAISHA, Toyota-shi, Aichi-ken (JP)

(72) Inventors: Takaho Kawakami, Susono (JP); Tomoaki Yanagida, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 122 days.

(21) Appl. No.: 14/896,049

(22) PCT Filed: Jun. 7, 2013

(86) PCT No.: PCT/JP2013/065885
§ 371 (c)(1),
(2) Date: Dec. 4, 2015

(87) PCT Pub. No.: WO2014/196084
PCT Pub. Date: Dec. 11, 2014

(65) Prior Publication Data
US 2016/0131230 A1   May 12, 2016

(51) Int. Cl.
*F16H 55/56* (2006.01)
*F16H 55/36* (2006.01)
(Continued)

(52) U.S. Cl.
CPC ............. *F16H 9/18* (2013.01); *F16H 55/56* (2013.01); *F16H 61/66272* (2013.01)

(58) Field of Classification Search
CPC .. F16H 55/56; F16H 61/66272; F16H 63/065; F16H 61/662; F16H 59/14
(Continued)

(56) References Cited

U.S. PATENT DOCUMENTS 3,190,135 A * 6/1965 Berens .................. F16H 9/12
474/19
4,722,718 A * 2/1988 Eugen .................. F16H 37/022
474/19
(Continued)

FOREIGN PATENT DOCUMENTS

JP   H05-203006   8/1993
JP   H11-72151 A  3/1999
(Continued)

*Primary Examiner* — Henry Liu
(74) *Attorney, Agent, or Firm* — Andrews Kurth Kenyon LLP

(57) ABSTRACT

A belt-driven continuously variable transmission adapted to prevent an occurrence of belt slippage is provided. The continuously variable transmission comprises a hydraulic actuator formed on a back side of a movable sheave to change a belt groove between a fixed sheave and a movable sheave, and a torque cam assembly adapted to convert a torque into an axial thrust force by a relative rotation between a pair of cam members contacted to each other. In the belt-driven continuously variable transmission, a piston fitted onto a shaft of the driven pulley while allowing to rotate relatively therewith and to reciprocate thereon is integrated with one of the cam members of driven side and with an output gear for outputting torque of the pulley. The cam member of drive side is fixed in an axial direction on a driven shaft to be rotated integrally therewith.

12 Claims, 5 Drawing Sheets

(51) Int. Cl.
  *F16H 59/00* (2006.01)
  *F16H 61/00* (2006.01)
  *F16H 63/00* (2006.01)
  *F16H 9/18* (2006.01)
  *F16H 61/662* (2006.01)

(58) Field of Classification Search
  USPC .................................................... 474/28, 10
  See application file for complete search history.

(56) References Cited

U.S. PATENT DOCUMENTS

| | | | | |
|---|---|---|---|---|
| 4,838,834 A * | 6/1989 | Miyata | ................ | F16H 63/067 474/11 |
| 5,046,991 A * | 9/1991 | Friedmann | ........ | F16H 61/66272 474/18 |
| 5,184,981 A * | 2/1993 | Wittke | .............. | F16H 61/66272 474/18 |
| 5,295,915 A * | 3/1994 | Friedmann | .............. | F16H 59/14 474/18 |
| 5,711,730 A * | 1/1998 | Friedman | ................ | F16H 59/14 474/18 |
| 5,879,253 A * | 3/1999 | Friedmann | .............. | F16H 59/14 474/18 |
| 6,068,565 A * | 5/2000 | Riemer | ............... | F16H 57/0456 474/18 |
| 6,241,635 B1 * | 6/2001 | Schmid | ................ | F16H 63/065 474/11 |
| 6,277,043 B1 * | 8/2001 | Friedmann | ........ | F16H 61/66272 474/18 |
| 6,322,466 B1 * | 11/2001 | Eidloth | ................ | F16C 27/066 474/18 |
| 6,336,878 B1 * | 1/2002 | Ehrlich | .................. | F16H 55/56 474/18 |
| 6,342,024 B1 * | 1/2002 | Walter | ................ | F16H 37/021 474/28 |
| 6,361,456 B1 * | 3/2002 | Walter | ................ | F16H 63/065 474/18 |
| 6,506,136 B2 * | 1/2003 | Schmid | ................ | F16H 63/065 474/18 |
| 6,669,588 B2 * | 12/2003 | Schmid | ............. | F16H 61/66272 474/17 |
| 6,786,844 B2 * | 9/2004 | Fritzer | .................... | F16H 55/56 474/15 |
| 7,131,921 B2 * | 11/2006 | Walter | .................... | F16H 55/56 474/18 |
| 7,967,707 B2 * | 6/2011 | Faust | ...................... | F16H 55/56 474/28 |
| 8,052,555 B2 * | 11/2011 | Muller | .................... | F16H 55/56 474/18 |
| 9,033,831 B2 * | 5/2015 | Kawakami | ............. | F16H 55/56 474/18 |
| 2005/0209031 A1 * | 9/2005 | Walter | .................... | F16H 55/56 474/18 |
| 2005/0250606 A1 * | 11/2005 | Shioiri | .................... | F16H 9/125 474/18 |
| 2006/0009321 A1 * | 1/2006 | Carlson | ................. | F16H 63/065 474/18 |
| 2006/0058130 A1 * | 3/2006 | Vornehm | ................. | F16H 55/56 474/28 |
| 2006/0105867 A1 * | 5/2006 | Reuschel | .................. | F16H 9/18 474/18 |
| 2007/0197322 A1 * | 8/2007 | Faust | ................ | F16H 61/66272 474/28 |
| 2007/0207884 A1 * | 9/2007 | Unno | ................ | F16H 61/66259 474/18 |
| 2007/0298917 A1 * | 12/2007 | Faust | ...................... | F16H 55/56 474/18 |
| 2008/0039251 A1 * | 2/2008 | Faust | ...................... | B60W 10/06 474/18 |
| 2008/0220917 A1 * | 9/2008 | Grethel | ................ | F16H 61/0031 474/28 |
| 2009/0176607 A1 * | 7/2009 | Muller | .................... | F16H 55/56 474/18 |
| 2009/0197717 A1 * | 8/2009 | Kremer | ............. | F16H 61/66272 474/18 |
| 2013/0324334 A1 * | 12/2013 | Kawakami | ............. | F16H 55/56 474/28 |

FOREIGN PATENT DOCUMENTS

JP   2009-192018 A   8/2009
WO   2012/127651 A1   9/2012

* cited by examiner

BELT-DRIVEN CONTINUOUSLY VARIABLE TRANSMISSION

CROSS-REFERENCE TO RELATED APPLICATION

This is a national phase application based on the PCT International Patent Application No. PCT/JP2013/065885 filed Jun. 7, 2013, the entire contents of which are incorporated herein by reference.

TECHNICAL FIELD

This invention relates to a belt-driven continuously variable transmission adapted to change a speed ratio continuously by varying an effective diameter position of a driving belt running between pulleys.

BACKGROUND ART

A conventional belt-driven continuously variable transmission comprises a pair of pulleys, an endless driving belt running between the pulleys, and a hydraulic chamber formed on each pulley. Oil is delivered to the hydraulic chamber of a drive pulley to change a speed ratio, and oil is delivered to the hydraulic chamber of a driven pulley to establish a belt clamping pressure. In the belt-driven continuously variable transmission thus structured, therefore, a speed ratio can be varied continuously by hydraulically changing groove widths of the pulleys to change running diameter positions of the belt.

However, in the belt-driven continuously variable transmission, power transmission is achieved frictionally between the belt and each pulley. That is, if the belt clamping pressure of the pulley is insufficient, a belt slip is caused on a contact face of the pulley. In order to prevent such belt slippage, the belt clamping pressure is controlled depending on a situation of a speed change operation and a transmission torque. To this end, various improvements have been made on a structure of the driven pulley and a hydraulic control system of the driven pulley, as disclosed in PCT international publication WO/2012/127651, and Japanese Patent Laid-Opens Nos. 2009-192018, 11-72151 and 5-203006.

PCT international publication WO/2012/127651 describes a belt-driven continuously variable transmission comprising a hydraulic actuator of a driven pulley, and a torque cam assembly adapted to establish a thrust force by a relative rotation between a pair of cam members. According to the teachings of WO/2012/127651, a piston forming the hydraulic chamber of the driven pulley is integrated with a drive cam member of the torque cam assembly. Japanese Patent Laid-Open No. 5-203006 discloses a transmission in which a hydraulic chamber and a torque sensor are arranged on a back side of a movable sheave of a drive pulley.

Japanese Patent Laid-Open No. 2009-192018 discloses a transmission in which a piston arranged on a back side of a movable sheave forms a hydraulic chamber of a secondary pulley, and in which an axial movement of the piston is stopped by a stopper member. According to the teachings of Japanese Patent Laid-Open No. 2009-192018, a gear for outputting torque of the secondary pulley is interposed between two stopper members in an axial direction, and one of the stoppers is interposed between an output gear and the piston. That is, one of the stopper members is brought into contact to the piston in the axial direction.

Japanese Patent Laid-Open No. 11-72151 describes a transmission in which a hydraulic chamber is formed by a movable cylinder attached to a movable sheave to serve as a hydraulic servo mechanism, and a fixed plunger fixed to a pulley shaft by the stopper member.

According to the teachings of WO/2012/127651, however, a bearing supporting the output gear is brought into contact to one of the cam member in the axial direction and hence the bearing is subjected to an axial load through contact faces of those members. For this reason, the bearing may be damaged by a thrust load. In addition, since the piston serving as the cam member is reciprocated hydraulically, a thrust load derived from hydraulic pressure is also applied to the bearing through the torque cam assembly.

According to the teachings of Japanese Patent Laid-Opens Nos. 2009-192018 and 11-72151, the stopper member for restricting an axial movement of the piston is disposed between the piston and the output gear. According to the teachings of Japanese Patent Laid-Open No. 5-203006, axial movement of one of the cam members can be restricted. However, according to the teachings of Japanese Patent Laid-Opens Nos. 2009-192018 and 11-72151, an actuating device for moving the piston toward the back side of the movable sheave is not available in the transmission. Likewise, according to the teachings of No. 5-203006, the torque sensor is not adapted to establish a thrust force for moving the movable sheave. According to the teachings of those prior art documents, therefore, belt slippage may be caused when hydraulic pressure applied to the hydraulic chamber is lowered by a trouble.

DISCLOSURE OF THE INVENTION

The present invention has been conceived noting the foregoing technical problem, and it is therefore an object of the present invention is to limit damage on a belt-driven continuously variable transmission having a hydraulic chamber and a torque cam assembly, by preventing a radial bearing from being subjected to thrust loads established by the hydraulic chamber and the torque cam assembly.

The present invention is applied to a belt-driven continuously variable transmission comprising: a drive pulley and a driven pulley, each of which is formed by a fixed sheave integrated with a rotary shaft and a movable sheave fitted onto the rotary shaft while being allowed to reciprocate thereon; and a belt running between the pulleys. In order to achieve the above-explained objective, according to the present invention, the belt-driven continuously variable transmission further comprises: a piston that is fitted onto the rotary shaft integrated with the driven pulley in such a manner to rotate relatively therewith through a bearing while being connected to a back face of the driven pulley in a liquid-tight manner; a hydraulic chamber formed between the back face of the driven pulley and the piston that is kept to a liquid-tight condition; a second cam face that is formed on a leading end of the piston in an opposite side of the driven pulley; a first cam face that is brought into contact to the second cam face to convert a torque into an axial thrust force; a first cam member having the first cam face that is fitted onto the rotary shaft of the driven pulley in such a manner to rotate integrally therewith, and that is fixed in the axial direction; and an output gear that is integrated with the piston fitted onto the rotary shaft of the driven pulley through a bearing.

In belt-driven continuously variable transmission according to the present invention, the end face of the bearing facing to the driven pulley is situated at a position not to come into contact to the piston.

In belt-driven continuously variable transmission according to the present invention, the output gear is situated between the first cam face and a bulkhead forming the hydraulic chamber in the axial direction, and the bearing is overlapped with the output gear in the axial direction.

In belt-driven continuously variable transmission, specifically, the first cam member is shaped into a cylindrical shape comprising a diametrically larger portion and a diametrically smaller portion in which an outer diameter thereof is smaller than that of the diametrically larger portion. In addition, the first cam face is formed on an end face of the diametrically larger portion facing to the driven pulley, and the bearing is disposed between an outer circumferential face of the diametrically smaller portion and an inner circumferential face of the piston.

In addition, an inner circumferential face of the first cam member is fitted onto an outer circumferential face of the rotary shaft of the driven pulley through a spline, and the spline, the output gear and the bearing are overlapped in the axial direction.

According to the present invention, the piston can be actuated to increase pressure in the hydraulic chamber by a thrust force generated by a relative rotation of the torque cam assembly resulting from increase in a transmission torque of the driven pulley. Therefore, a required belt clamping pressure of the driven pulley can be ensured by a thrust force generated by the torque cam assembly to prevent an occurrence of belt slippage. Moreover, since the torque cam assembly is adapted to generate a thrust force in accordance with a transmission torque of the driven pulley, a required belt clamping pressure of the driven pulley can be achieved promptly. Further, a transmission torque required by the driver can be maintained by maintaining the pressure in the hydraulic chamber of the driven pulley to a relatively low level without requiring a complex control. Furthermore, since a thrust load acting between the cam faces will not be applied to the bearing supporting the output gear, the output gear can be prevented from being damaged by such thrust load to limit a damage on the belt-driven continuously variable transmission.

In addition, a speed ratio of the CVT can be fixed by confining oil in the hydraulic chamber of the pulley. Therefore, it is not necessary to generate a high pressure by driving the oil pump to regulate the pressure in the hydraulic chamber. For this reason, power loss can be reduced and fuel can be saved. Further, the pressure in the hydraulic chamber can be increased to ensure a required belt clamping pressure of the driven pulley by pushing the piston by the torque cam assembly even when the oil cannot be delivered to the driven pulley due to failure of a hydraulic control unit. Thus, damage on the belt driven continuously variable transmission can be limited.

DETAILED DESCRIPTION OF THE PREFERRED EMBODIMENT(S)

Figure 1:
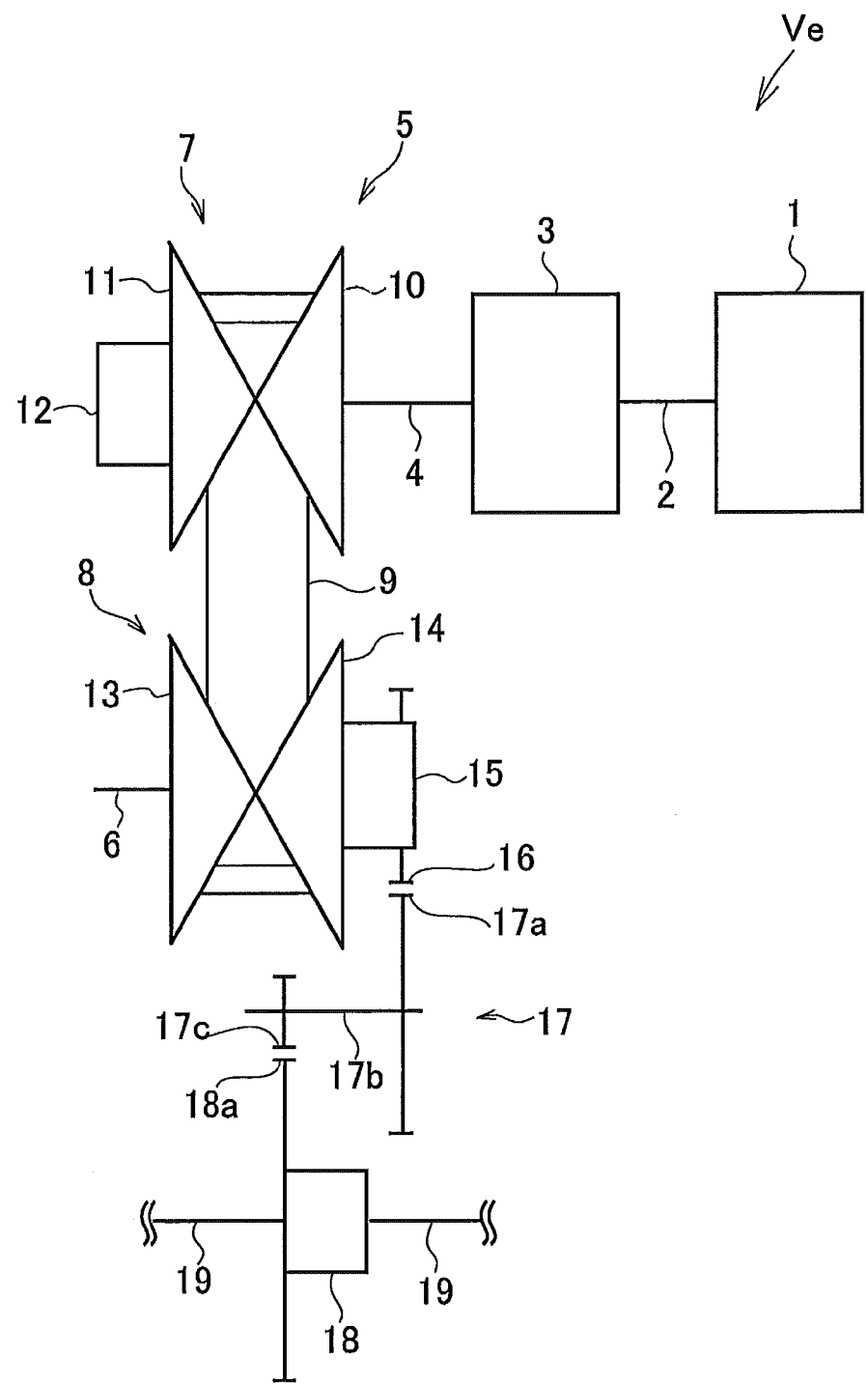
FIG. 1 is a skeleton diagram showing a vehicle to which one example of the belt-driven continuously variable transmission according to the present invention is applied.

A preferred example of the present invention will be explained hereinafter. Referring now to FIG. 1, there is shown a powertrain of a vehicle to which a belt-driven continuously variable transmission according to the preferred example is applied. An engine 1 show in FIG. 1 serving as a prime mover of a vehicle Ve includes a gasoline engine and a diesel engine, and an output torque of the engine 1 is controlled by operating an accelerator.

A crank shaft 2 of the engine 1 is connected to a transmission device 3 such as a torque converter or a torque reversing device. The transmission device 3 is connected to a belt-driven continuously variable transmission 5 through a drive shaft 4 so that an output torque of the engine 1 is delivered to the belt-driven continuously variable transmission 5 via the crank shaft 2, the transmission device 3 and the drive shaft 4.

The belt-driven continuously variable transmission (hereinafter abbreviated as the "CVT") 5 comprises a drive pulley 7 rotated integrally with the drive shaft 4, a driven pulley 8 rotated integrally with a driven shaft 6 arranged parallel to the drive shaft 4, and an endless belt 9 held in belt grooves of the pulleys 7 and 8. For example, a metal belt formed of a plurality of elements and a layered ring, a dry hybrid belt formed of a plurality of elements and a resin belt having core wires penetrating therethrough, and a rubber belt having resin core wires penetrating therethrough may be used as the belt 9.

The drive pulley 7 comprises a fixed sheave integrated with the drive shaft 4, and a movable sheave 11 fitted onto the drive shaft 4. The movable sheave 11 is allowed to rotate integrally with the drive shaft 4, and to reciprocate on the drive shaft 4 toward and away from the fixed sheave 10. A V-shaped belt groove is formed between a conical face 10a of the fixed sheave 10 and a conical face 11a of the fixed sheave 11 being opposed to each other. A width of the belt groove is increased gradually from a rotational center of drive pulley 7 toward an outer circumferential end.

In order to change a width of the belt groove by hydraulically reciprocating the movable sheave 11, an actuator 12 is arranged on a back side of the movable sheave 11, and an internal space of the actuator 12 serves as a hydraulic chamber 12a to which oil is delivered. Specifically, a thrust force established by a hydraulic pressure in the hydraulic chamber 12A is applied to the movable sheave 11 to push the movable sheave 11 in an axial direction.

A power of the rotating drive pulley 7 is transmitted to the belt 9 by a friction between each lateral face of the belt 9 and conical face 10a of the fixed sheave 10 and conical face 11a of the movable sheave 11. Consequently, the driven pulley 8 is rotated by the belt 9 running between the drive pulley 10 and driven pulley 8.

A speed ratio of the CVT 5 can be varied continuously by changing an effective diameter position of the belt 9 running in the drive pulley 7. Specifically, a speed ratio of the CVT 5 is governed by a ratio between rotational speeds of the drive shaft 4 and the driven shaft 6 that is changed by changing effective diameter positions of the belt 9 in the pulleys 7 and 8.

Figure 2:
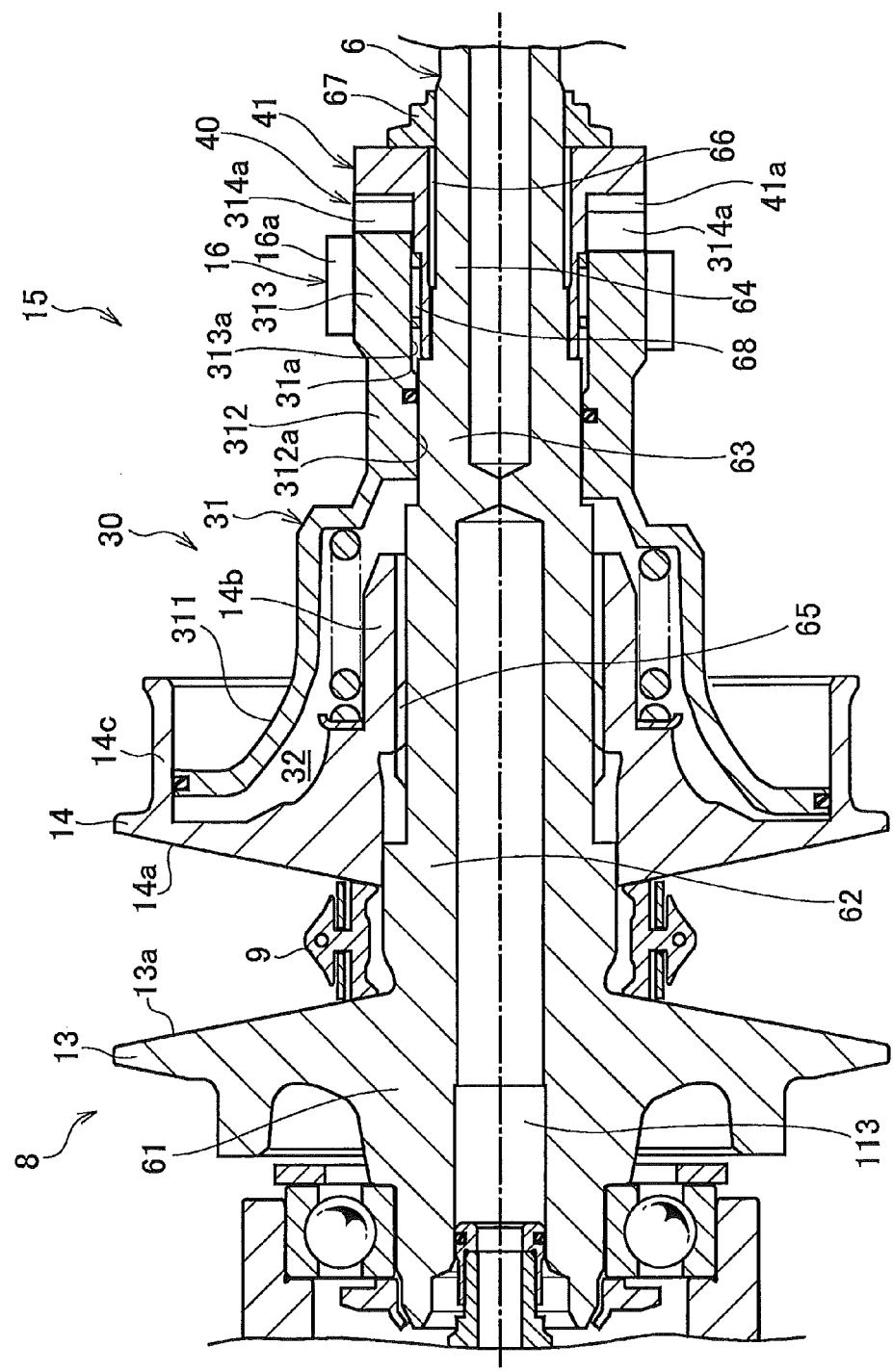
FIG. 2 is a cross-sectional view of one example of the driven pulley of the belt-driven continuously variable transmission.

Here will be explained the driven pulley 8 with reference to FIG. 2. As illustrated in FIG. 2, the driven pulley 8 is adapted to be rotated integrally with the driven shaft 6 serving as a counter shaft. A fixed sheave 13 is formed in a diametrically largest first section 61 of the driven shaft 6 in such a manner to expand radially outwardly. A conical face 13a is formed on the fixed sheave 13 to be opposed to a movable sheave 14.

A conical face 14a is also formed on the movable sheave 14 to be opposed to the conical face 13a of the fixed sheave 13 so that a V-shaped belt groove is formed therebetween. In the driven pulley 8, a width of the belt groove is also increased gradually from a rotational center of driven pulley 8 toward an outer circumferential end.

On a back face of the movable sheave 14, a first cylindrical boss 14b is formed on a radially inner side, and a second cylindrical boss 14c is formed on near an outer circumferential edge. An inner circumferential face of the first boss 14c is splined onto an outer circumferential face of a second section 62 of the driven shaft 6 so that the movable sheave 14 is allowed to rotate integrally with the driven shaft 6 and to reciprocate on the driven shaft 6. Here, an outer diameter of the second section 62 of the driven shaft 6 is smaller than that of the first section 61.

In order to move the movable sheave 14 toward the fixed sheave 13, an actuator 15 is arranged on a back side of the movable sheave 14. In the driven pulley 8, a belt clamping pressure by the fixed sheave 13 and the movable sheave 14 and a tension of the belt 9 are increased by increasing a thrust force applied to the movable sheave 14 from the actuator 15. The actuator 15 shown in FIG. 2 includes a hydraulic actuator 30 having a hydraulic chamber 32 to which oil is delivered from an oil passage 113, and a torque cam assembly 40 adapted to convert a rotational motion into a reciprocating motion by a relative rotation between a pair of cam members.

The hydraulic actuator 30 comprises a piston 31 fitted onto the driven shaft 6. Specifically, a cylindrical portion 312 of the piston 31 is fitted onto a third section 63 of the driven shaft 6 that is diametrically smaller than the second section 62 in such a manner that an inner circumferential face 312a of the cylindrical portion 312 is allowed to rotate relatively with an outer circumferential face of the third section 63, and that the piston 31 is allowed to reciprocate on the driven shaft 6. In addition, a step portion is formed between the second section 62 and the third section 63 of the driven shaft 6, and a sealing member is disposed on the inner circumferential face 312a of the cylindrical portion 312 to keep the hydraulic chamber 32 into a liquid-tight condition.

The piston 31 further comprises a bulkhead 311 extending from the cylindrical portion 312 toward the back face of the movable sheave 14 while expanding radially outwardly. A sealing member is also disposed on a leading end of the bulkhead 311, and the leading end of the bulkhead 311 is brought into contact to an inner circumferential face of the second boss 14c of the movable sheave 14 in a slidable manner so that the hydraulic chamber 32 of the driven pulley 8 can be kept in the liquid tight condition. That is, the bulkhead 311 serves as a partition wall of the hydraulic chamber 32, and hydraulic pressure in the hydraulic chamber 32 is applied to an inner circumferential face of the bulkhead 311 and to the back face of the movable sheave 14.

Thus, both the movable sheave 14 and the piston 31 are allowed to reciprocate on the driven shaft 6, and the movable sheave 14 and the piston 31 are allowed to rotate and reciprocate relatively to each other. That is, the inner circumferential face of the second boss 14c of the movable sheave 14 and the leading end of the piston 31 are allowed to rotate and reciprocate relatively to each other.

The piston 31 further comprises a cylindrical geared portion 313 formed on an opposite side of the bulkhead 312 across the cylindrical portion 312. An inner diameter of the geared portion 313 is larger than that of the cylindrical portion 312 and entirely constant so that a step portion 31a is formed between the inner circumferential face 312a of the cylindrical portion 312 and an inner circumferential face 313a of the of the geared portion 313.

An outer diameter of the geared portion 313 is larger than that of the cylindrical portion 312, gear teeth 16a of an output gear 16 are formed around the geared portion 313. The output gear 16 is rotated relatively with the driven gear and reciprocated on the driven shaft 6 integrally with the piston 31. Each gear tooth 16a has a predetermined length in an axial direction, and a tooth trace thereof may be oriented not only parallel to the axial direction but also diagonal to the axial direction. That is, the output gear 16 may be formed not only into a spur gear but also into a helical gear. As shown in FIG. 1, the gear teeth 16a are meshed with a diametrically larger gear 17a as a driven gear, and as shown in FIG. 2, the output gear 16 will not be disengaged from the diametrically larger gear 17a by an axial movement of the piston 31.

A second cam face 314a of the torque cam assembly 40 is formed on an axial end of the geared portion 313, that is, on the other leading end of the piston 31 in an opposite side of the movable sheave 14. Specifically, the torque cam assembly 40 comprises a pair of cam members individually having a cam face adapted to convert a torque applied to one of the cam members into an axial thrust force for moving the other cam member. That is, the torque cam assembly 40 is adapted to change a direction of a thrust force applied thereto from a rotational direction to an axial direction by a contact between the cam faces. Thus, the piston 31 having the second cam face 314a serves as one of the cam members of the torque cam assembly 40. In other words, one of the cam members of the torque cam assembly 40 is integrated with the axial leading end of the piston 31. The second cam face 314a of the piston 31 is opposed to a first cam face 41a of a first cam shaft 41. That is, according to the preferred example, the first cam member of drive side is integrated with the first cam member 41, and the second cam member of driven side is integrated with the piston 31.

Figure 3:
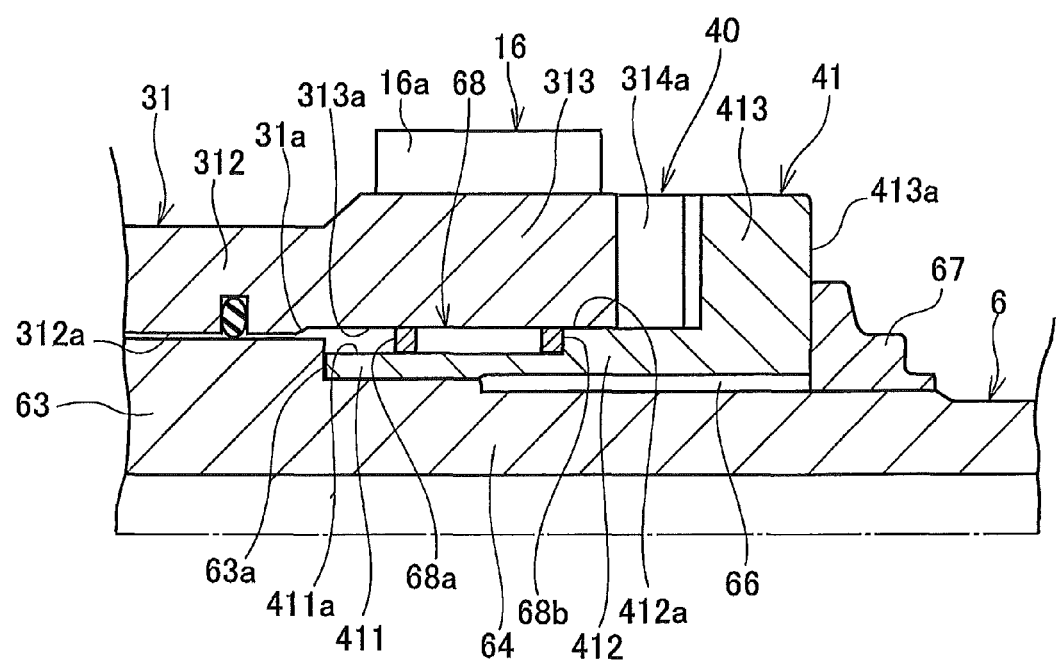
FIG. 3 is an enlarged cross-sectional view of the output gear of the driven pulley shown in FIG. 2.

The first cam shaft 41 is formed into a cylindrical shape, and an inner circumferential face of the first cam shaft 41 is splined onto a fourth section 64 of the driven shaft 6 that is diametrically smaller than the third section 63. As illustrated in FIG. 3, the first cam shaft 41 is fixed in the axial direction by a locknut 67 fitted onto the driven shaft 6 while being contacted with an end face 413a of the first cam shaft 41. Meanwhile, the driven shaft 6 has a diametrically larger step portion 63a between the third section 63 and the fourth section 64, and the other end of the first cam shaft 41 in the driven pulley 8 side is brought into contact to the step portion 63a. Thus, the first cam shaft 41 is disposed between the driven shaft 6 and the locknut 67.

In order to allow the piston 31 to rotate relatively with the driven shaft 6, a bearing 68 is interposed between an inner circumferential face of the piston 31 and an outer circumferential face of the first cam shaft 41. Specifically, a radial bearing having a plurality of rollers is used as the bearing 68. The first cam shaft 41 also comprises a plurality of sections having different diameters such as a diametrically smallest section 411, an intermediate section 412 at which the diameter thereof is larger than that of the diametrically smallest section 411, and a diametrically smallest section 413 at which the diameter thereof is larger than that of the intermediate section 412. According to the preferred example, the bearing 68 is interposed between an outer circumferential face 411a of the diametrically smallest section 411 of the first cam shaft 41 and an inner circumferential face 313a of the geared portion 313 of the piston 31. That is, the bearing 68 support the output gear 16 in such a manner to rotate relatively with the driven shaft 6 while being subjected to a radial load. An inner diameter of the geared portion 313 is entirely constant so that inner circumferential face 313a of the geared portion 313 is brought into contact to an outer circumferential face of the bearing 68 and an outer circumferential face 412a of the intermediate section 412.

The bearing 68 comprises an end face 68a of the driven pulley 8 side and an end face 68b of the opposite side. In addition, the bearing 68 is fitted onto the fourth section 64 and an outer circumferential edge thereof is situated outer side of the outer circumferential face of the third section 63. That is, the end face 68a of the bearing 68 is opposed to the step portion 31a of the piston 31 fitted onto the third section 63 in the axial direction while keeping a clearance therebetween. Accordingly, when the piston 31 is moved away from the driven pulley 8, the step portion 31a comes into contact to the end face 68 of the bearing 68 but not pushes the bearing 68 in the axial direction. On the other hand, the other end face 68b of the bearing 68 is brought into contact to a step portion formed between the diametrically smallest section 411 and the intermediate section 412 of the first cam shaft 41.

Thus, since the piston 31 is allowed to reciprocate on the driven shaft 6 and the first cam shaft 41, the gear teeth 16a are allowed to reciprocate in the axial direction while being meshed with the diametrically larger gear 17a shown in FIG. 1. In other words, the gear teeth 16a of the output gear 16 are kept to be overlapped with the bearing 68 in the axial direction even when the piston 31 is moved in the axial direction. In addition, the output gear 16 and the bearing 68 are kept to be overlapped with a spline 66 between the driven shaft 6 and the first cam shaft 41. Here, the driven shaft 6 is supported by a bearing 51 at the first section 61, and by a stationary member such as a casing through a not shown bearing at the fourth section 64. That is, the driven shaft 6 is fixed in the axial direction. Accordingly, torque transmitted to the driven pulley 8 through the belt 9 is further transmitted to the piston 31 via the sheaves 13 and 14, the driven shaft 6, the first cam shaft 41 and the cam faces 41a and 314a, and outputted from the output gear 16 integrated with the piston 31. Thus, the output gear 16 is integrated with the piston member at the driven pulley 8 side, and with the cam member at the opposite side.

Figure 4:
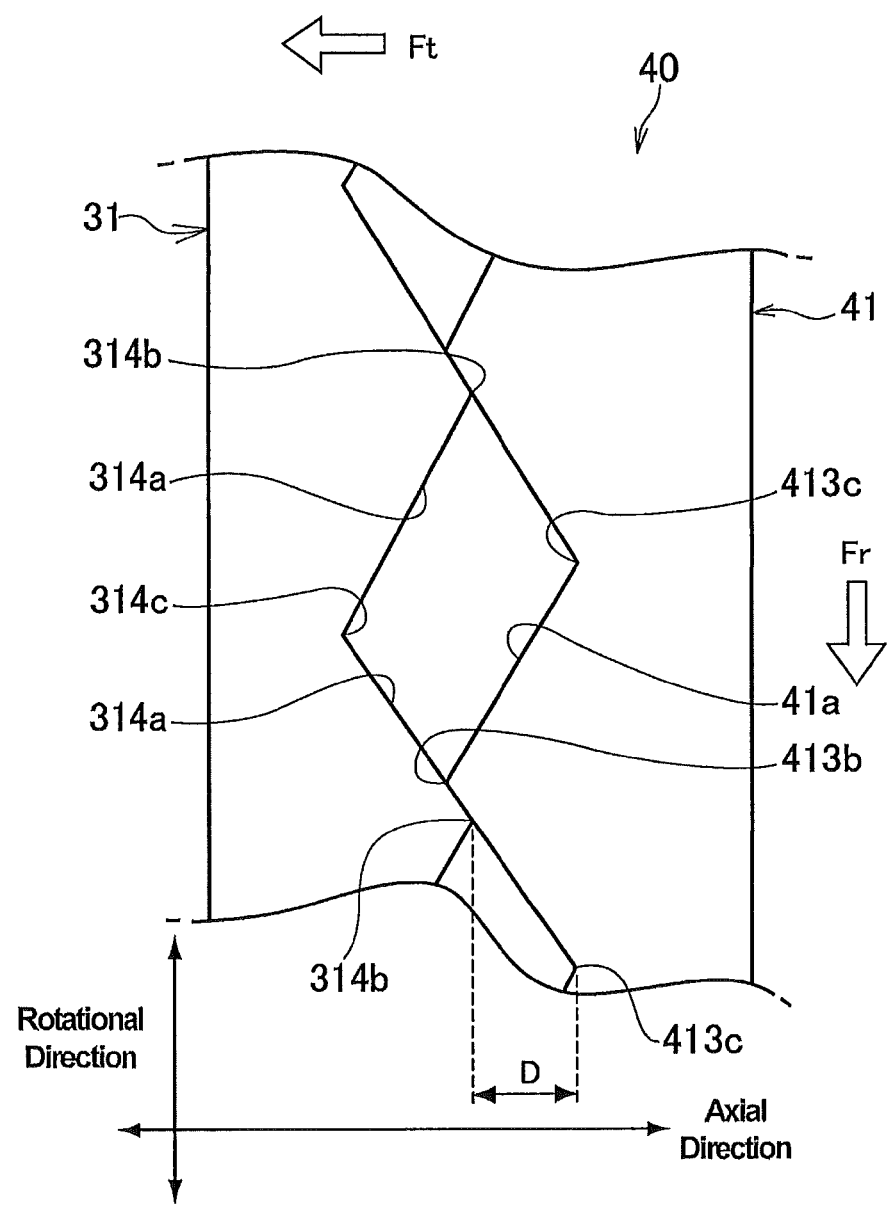
FIG. 4 is a schematic illustration showing the torque cam assembly arranged on the back side of the driven pulley shown in FIG. 2.

According to the preferred example, torque is transmitted through the torque cam assembly 40. Specifically, a relative rotation between the first cam shaft 41 having the first cam face 41a and the piston 31 having the second cam face 314a is caused by an increase in the transmission torque to establish a thrust force for pushing the piston 31 toward the movable sheave 14. A structure of the torque cam assembly 40 is illustrated in an enlarged scale in FIG. 4. As illustrated in FIG. 40, the first cam face 41a and the second cam face 314a are individually inclined at a predetermined degree in the circumferential direction, and those cam faces are opposed to each other.

Specifically, a ridge 413b and a valley 413c are formed alternately on the first cam face 41a of the first cam shaft 41 as a drive member (i.e., a first cam member), and a ridge 314b and a valley 314c are formed alternately on the second cam face 314a of the piston 31 as a driven member (i.e., a second cam member). Each ridge 413b of the first cam face 41a is individually contacted to the ridge 314b of the second cam face 314a in a slidable manner.

Accordingly, the piston 31 is rotated by a rotation of the first cam shaft 14 through the second cam face 314a and the first cam face 41a thus brought into frictional engagement to each other. Consequently, since the first cam face 41a and the second cam face 314a are inclined with respect to a rotational direction, a component of force acting in the rotational direction acts in the axial direction. That is, a load Fr acting on the contact face between the first cam face 41a and the second cam face 314a in the rotational direction is converted into a thrust force Ft acting in the axial direction.

In this situation, since the first cam shaft 41 is fixed in the axial direction, the piston 31 is moved toward the movable sheave 14 by a thrust force derived from the thrust force Ft. Here, the thrust force Ft is varied depending on a transmission torque, and when the transmission torque of the torque cam assembly 40 is increased to an extent possible to establish the thrust force Ft for moving the piston 31 toward the movable sheave 14, a clearance D in the axial direction between ridge 314b of the piston 31 and valley 413c of the first cam shaft 41 is widened depending on the transmission torque.

As a result of pushing the piston 31 toward the movable sheave 14 by the thrust force Ft, hydraulic pressure in the hydraulic chamber 32 is increased. That is, the thrust force Ft also acts to assist a belt clamping pressure of the driven pulley 8. That is, since the first cam shaft 41 is fixed in the axial direction, the first cam shaft 41 serves as a reaction element to move the movable sheave 14 in the axial direction and to establish the belt clamping pressure of the driven pulley 8.

Optionally, a surface treatment to increase a friction coefficient may be applied to the cam faces 41a and 314a. Given that the output gear 16 is a helical gear, an inclination a of the cam face 41a or 314a with respect to the rotational direction may be reduced to be smaller than an inclination of the gear tooth 16a with respect to the axial direction. In addition, the actuator 15 may be provided with a precompression device for applying an axial thrust to the movable sheave 14 even when none of the hydraulic actuator 30 and torque cam assembly 40 is in activation. To this end, a coil spring may be arranged in the hydraulic chamber 30 to serve as the precompression device while being contacted to the back face of the movable sheave 14 and an inner wall of the piston 31. In this case, the precompression device is used to establish an axial thrust to create a belt clamping pressure of the driven pulley 8 at an initial phase where an engine torque has not yet been delivered to the driven pulley 8.

The vehicle Ve shown in FIG. 1 is an FF (i.e., Front engine Front drive) layout vehicle in which torque of the output gear 16 is delivered to a front differential 18 as a final reduction through the reduction gear 17. Specifically, the diametrically larger gear 17a is fitted onto a reduction gear shaft 17b while being meshed with the output gear 16. A diametrically smaller gear 17c is also fitted onto the reduction gear shaft 17b while being meshed with a ring gear 18a of the front differential 18. The torque delivered to the front differential 18 is distributed to not shown drive wheels through drive shafts 19.

Figure 5:
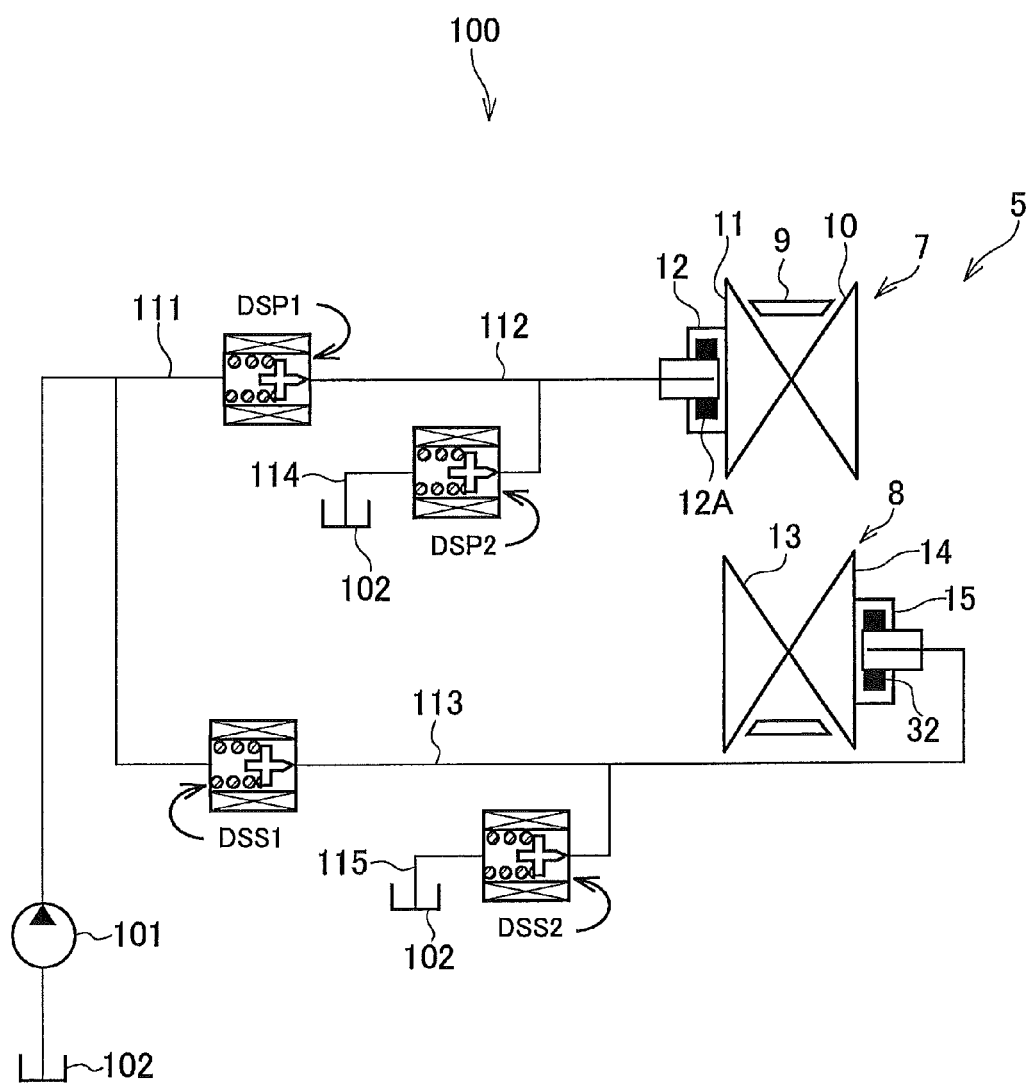
FIG. 5 is a schematic diagram showing one example of the hydraulic circuit for delivering oil to the hydraulic chamber of the belt-driven continuously variable transmission.

Next, a hydraulic circuit for delivering oil to the hydraulic chamber of the CVT 5 will be explained hereinafter. As shown in FIG. 5, according to the preferred example, the hydraulic circuit 100 is provided with a mechanical oil pump 101 as a hydraulic source. The oil pump 101 is driven by the engine 1 to pump up the oil from an oil pan 102 and to discharge the oil to an oil passage 111. Specifically, the oil pump 101 is driven by the engine 1 in both cases in which the engine 1 is driven by burning fuel and in which the engine 1 is rotated passively by an inertial force of the coasting vehicle Ve without fuel supply. That is, the oil pump 101 is driven to generate hydraulic pressure not only during driving the vehicle by the engine 1 but also during applying an engine braking force to the vehicle Ve. In order to control the hydraulic circuit 100, the vehicle Ve is provided with a not shown electronic control unit (ECU).

In the hydraulic circuit 100, the oil discharged from the oil pump 101 is distributed to the hydraulic chamber 12A of the actuator 12 of the drive pulley 7 to change a speed ratio by changing an effective running diameter of the belt 9, and to the hydraulic chamber 32 of the actuator 15 of the driven pulley 8 to establish a belt clamping pressure by the driven pulley 8. In order to transmit the torque required to propel the vehicle Ve through the CVT 5, relatively highly pressurized oil is delivered to the hydraulic chambers 12A and 32.

The hydraulic chamber 12A of the drive pulley 7 is connected to an oil passage 112, and an electromagnetic on-off valve DSP1 is disposed on the oil passage 112 to selectively provide a connection between the oil passages 111 and 112. That is, an oil supply to the hydraulic chamber 12A is selectively enabled by electrically switching the on-off valve DSP1 to selectively open a delivery route. A discharging passage 114 branches from the oil passage 112 to provide a connection between the hydraulic chamber 12A and an oil pan 102, and an electromagnetic on-off valve DSP2 is disposed on the discharging passage 114. Therefore, the oil can be selectively drained from the hydraulic chamber 12A to the oil pan 102 by electrically switching the on-off valve DSP2 to selectively open a discharging route.

The hydraulic chamber 32 of the driven pulley 8 is connected to an oil passage 113, and an electromagnetic on-off valve DSS1 is disposed on the oil passage 113 to selectively provide a connection between the oil passages 111 and 113. That is, an oil supply to the hydraulic chamber 32 is selectively enabled by electrically switching the on-off valve DSS1 to selectively open a delivery route. A drain passage 115 branches from the oil passage 113 to provide a connection between the hydraulic chamber 32 and the oil pan 102, and an electromagnetic on-off valve DSS2 is disposed on the drain passage 115. Therefore, the oil can be selectively drained from the hydraulic chamber 32 to the oil pan 102 by electrically switching the on-off valve DSS2 to selectively open a discharging route.

A torque transmitting capacity of the CVT 5 is controlled in such a manner that a belt slippage can be prevented by controlling oil delivered to the hydraulic chamber 32 of the driven pulley 8 establishing a belt clamping pressure. To this end, a required driving force is calculated based on an opening degree of an accelerator or a throttle valve, and a target engine torque is calculated based on the required driving force. Then, a target pressure in the hydraulic chamber 32 is calculated based on a parameter such as an input torque to the CVT 5, and the pressure in the hydraulic chamber 32 is controlled to achieve the target pressure. For this purpose, a map or formula for determining the target pressure in the hydraulic chamber 32 based on the above-mentioned parameter is installed in the electronic control unit.

For example, when a transmission torque of the CVT 5 is increased, hydraulic pressure in the hydraulic chamber 32 of the driven pulley 8 is increased. In the hydraulic circuit 100 shown in FIG. 5, specifically, hydraulic pressure in the hydraulic chamber 32 can be increased by opening the on-off valve DSS1 to provide a connection between the oil pump 101 and the hydraulic chamber 32, while closing the on-off valve DSS2 to close the drain passage 115.

By contrast, when a transmission torque of the CVT 5 is decreased, hydraulic pressure in the hydraulic chamber 32 of the driven pulley 8 is reduced. In the hydraulic circuit 100 shown in FIG. 5, specifically, hydraulic pressure in the hydraulic chamber 32 can be reduced by closing the on-off valve DSS1 to stop oil delivery to the hydraulic chamber 32, while opening the on-off valve DSS2 to allow drainage of oil from the hydraulic chamber 32. Here, given that an input torque to the CVT 5 is constant, torque transmitting capacity of the CVT 5 is maintained by confining oil in the hydraulic chamber 32 by closing both on-off valves DSS1 and DSS2.

Next, a control of speed ratio of the CVT 5 will be explained hereinafter. First of all, a required driving force to propel the vehicle is calculated based on a vehicle speed and a depression of an accelerator pedal (i.e., an opening degree of the accelerator), and a target engine power is calculated based on the required driving force. Then, a target speed engine speed to achieve the target engine power is calculated in an optimally fuel efficient manner, and a speed ratio of the CVT 5 is controlled to adjust an actual engine speed to the target engine speed. Specifically, speed ratio of the CVT 5 is changed by changing a delivery amount of the oil to the hydraulic chamber 12A of the drive pulley 7. To this end, a map or formula for determining the oil delivery amount to the hydraulic chamber 12A based on the target speed ratio of the CVT 5 is installed in the electronic control unit. Then, the oil delivery amount to the hydraulic chamber 12A of the drive pulley 7 is controlled by selectively opening and closing the on-off valves DSP1 and DSP2 in such a manner to achieve the target delivery amount.

For example, in case of reducing a speed ratio of the CVT 5 (i.e., upshifting), the on-off valve DSP1 is opened to increase a delivery amount of the oil to the hydraulic chamber 12A to narrow the belt groove of the drive pulley 7 (to increase an effective running diameter of the belt 9). By contrast, in case of increasing a speed ratio of the CVT 5 (i.e., downshifting), the on-off valve DSP2 is opened to drain oil from the hydraulic chamber 12A to the oil pan 102 to widen the belt groove of the drive pulley 7 (to decrease an effective running diameter of the belt 9). In case of maintaining a speed ratio of the CVT 5, oil is confined in the hydraulic chamber 12A by closing all of the on-off valves DSP1, DSP2, DSS1 and DSS2.

Thus, a speed ratio of the CVT 5 is controlled in such a manner that the engine 1 is operated in line with an optimum fuel efficient curve. If a manual shifting device is operated by a driver, a speed ratio of the CVT 5 may also be changed stepwise (in both upshifting and downshifting). Here, in case a speed ratio of the CVT 5 is changed manually by operating the shifting device, the speed ratio of the CVT 5 is fixed to the ratio selected by the shifting device irrespective of the optimum fuel efficient curve.

When the vehicle is cruising while keeping an opening degree of the accelerator to a predetermined degree, the belt clamping pressure of the driven pulley 8 is kept to a constant level. In this case, oil is confined in both chambers 12A and 32 by closing all of the on-off valves DSP1, DSP2, DSS1 and DSS2. In order to prevent oil leakage from the on-off valves DSP1, DSP2, DSS1 and DSS2, for example, a poppet valve or a check valve adapted to prevent an oil leakage therefrom may by suitable for the on-off valves DSP1, DSP2, DSS1 and DSS2.

As described, in the CVT according to the preferred example, the piston can be actuated to increase the pressure in the hydraulic chamber by a thrust force generated by a relative rotation of the torque cam assembly resulting from increase in a transmission torque of the driven pulley. In addition, a required belt clamping pressure of the driven pulley may also be ensured by the thrust force generated by the torque cam assembly to prevent an occurrence of belt slippage.

Moreover, since the torque cam assembly is adapted to generate a thrust force in accordance with a transmission torque of the driven pulley, a required belt clamping pressure of the driven pulley can be achieved promptly. In addition, a transmission torque required by the driver can be maintained by maintaining the pressure in the hydraulic chamber of the driven pulley to a relatively low level without requiring a complex control.

Further, a speed ratio of the CVT can be fixed by closing the on-off valves to confine the oil in the hydraulic chamber of the pulley. Therefore, it is not necessary to generate a high pressure by driving the oil pump to regulate the pressure in the hydraulic chamber. For this reason, power loss can be reduced and fuel can be saved.

Furthermore, the pressure in the hydraulic chamber can be increased to ensure a required belt clamping pressure of the driven pulley by pushing the piston by the torque cam assembly even when the oil cannot be delivered to the driven pulley due to failure of a hydraulic control unit. In addition, damage on the CVT can be limited.

REFERENCE SIGNS LIST

4: drive shaft; 5: belt-driven continuously variable transmission (CVT); 6: driven shaft; 7: drive pulley; 8: driven pulley; 9: belt; 13: fixed sheave; 14: movable sheave; 15: actuator; 16: output gear; 30: hydraulic actuator; 31: piston; 31a: step portion; 32: hydraulic chamber; 40: torque cam assembly; 41: first cam shaft; 41a: first cam face: 61: first section; 62: second section; 63: third section; 63a: step portion; 64: fourth section; 65: first spline; 66: second spline; 67: locknut; 68: bearing; 68a, 68b: end faces; 311: bulkhead; 312: cylindrical portion; 313: geared portion; 313a: inner circumferential face; 314a: second cam face; 411: diametrically smaller portion; 411a: outer circumferential face; 412: intermediate portion: 412a: outer circumferential face; 413: diametrically larger portion; 413a: end face.

The invention claimed is:

1. A belt-driven continuously variable transmission, which has:
a drive pulley and a driven pulley, each of which is formed by a fixed sheave integrated with a rotary shaft and a movable sheave fitted onto the rotary shaft while being allowed to reciprocate thereon;
a belt running between the pulleys;
comprising:
a piston that is fitted onto the rotary shaft integrated with the driven pulley in such a manner to rotate relatively therewith through a bearing while being connected to a back face of the driven pulley in a liquid-tight manner;
a hydraulic chamber formed between the back face of the driven pulley and the piston that is kept to a liquid-tight condition;
a second cam face that is formed on a leading end of the piston in an opposite side of the driven pulley;
a first cam face that is brought into contact to the second cam face to convert a torque into an axial thrust force;
a first cam member having the first cam face that is fitted onto the rotary shaft of the driven pulley in such a manner to rotate integrally therewith, and that is fixed in the axial direction; and
an output gear that is integrated with the piston fitted onto the rotary shaft of the driven pulley through a bearing.

2. The belt-driven continuously variable transmission as claimed in claim 1, wherein an end face of the bearing facing to the driven pulley is situated at a position not to come into contact to the piston.

3. The belt-driven continuously variable transmission as claimed in claim 1,
wherein the output gear is situated between the first cam face and a bulkhead forming the hydraulic chamber in the axial direction, and
wherein the bearing is overlapped with the output gear in the axial direction.

4. The belt-driven continuously variable transmission as claimed in claim 1,
wherein the first cam member is shaped into a cylindrical shape comprising a diametrically larger portion and a diametrically smaller portion in which an outer diameter thereof is smaller than that of the diametrically larger portion,
wherein the first cam face is formed on an end face of the diametrically larger portion facing to the driven pulley, and
wherein the bearing is disposed between an outer circumferential face of the diametrically smaller portion and an inner circumferential face of the piston.

5. The belt-driven continuously variable transmission as claimed in claim 4,
wherein an inner circumferential face of the first cam member is fitted onto an outer circumferential face of the rotary shaft of the driven pulley through a spline, and
wherein the spline, the output gear and the bearing are overlapped in the axial direction.

6. The belt-driven continuously variable transmission as claimed in claim 2,
wherein the output gear is situated between the first cam face and a bulkhead forming the hydraulic chamber in the axial direction, and
wherein the bearing is overlapped with the output gear in the axial direction.

7. The belt-driven continuously variable transmission as claimed in claim 2,
wherein the first cam member is shaped into a cylindrical shape comprising a diametrically larger portion and a diametrically smaller portion in which an outer diameter thereof is smaller than that of the diametrically larger portion,
wherein the first cam face is formed on an end face of the diametrically larger portion facing to the driven pulley, and
wherein the bearing is disposed between an outer circumferential face of the diametrically smaller portion and an inner circumferential face of the piston.

8. The belt-driven continuously variable transmission as claimed in claim 3,
wherein the first cam member is shaped into a cylindrical shape comprising a diametrically larger portion and a diametrically smaller portion in which an outer diameter thereof is smaller than that of the diametrically larger portion, wherein the first cam face is formed on an end face of the diametrically larger portion facing to the driven pulley, and wherein the bearing is disposed between an outer circumferential face of the diametrically smaller portion and an inner circumferential face of the piston.

9. The belt-driven continuously variable transmission as claimed in claim 6, wherein the first cam member is shaped into a cylindrical shape comprising a diametrically larger portion and a diametrically smaller portion in which an outer diameter thereof is smaller than that of the diametrically larger portion, wherein the first cam face is formed on an end face of the diametrically larger portion facing to the driven pulley, and wherein the bearing is disposed between an outer circumferential face of the diametrically smaller portion and an inner circumferential face of the piston.

10. The belt-driven continuously variable transmission as claimed in claim 7, wherein an inner circumferential face of the first cam member is fitted onto an outer circumferential face of the rotary shaft of the driven pulley through a spline, and wherein the spline, the output gear and the bearing are overlapped in the axial direction.

11. The belt-driven continuously variable transmission as claimed in claim 8, wherein an inner circumferential face of the first cam member is fitted onto an outer circumferential face of the rotary shaft of the driven pulley through a spline, and wherein the spline, the output gear and the bearing are overlapped in the axial direction.

12. The belt-driven continuously variable transmission as claimed in claim 9, wherein an inner circumferential face of the first cam member is fitted onto an outer circumferential face of the rotary shaft of the driven pulley through a spline, and wherein the spline, the output gear and the bearing are overlapped in the axial direction.

* * * * *